(12) United States Patent
Phillips

(10) Patent No.: US 12,352,370 B2
(45) Date of Patent: Jul. 8, 2025

(54) VALVE WITH STEPPED BUSHING DESIGN

(71) Applicant: YARDNEY WATER MANAGEMENT SYSTEMS INC., Riverside, CA (US)

(72) Inventor: Chris Phillips, Riverside, CA (US)

(73) Assignee: YARDNEY WATER MANAGEMENT SYSTEMS INC., Riverside, CA (US)

( * ) Notice: Subject to any disclaimer, the term of this patent is extended or adjusted under 35 U.S.C. 154(b) by 97 days.

(21) Appl. No.: 18/532,520

(22) Filed: Dec. 7, 2023

(65) Prior Publication Data

US 2024/0191814 A1 Jun. 13, 2024

Related U.S. Application Data

(60) Provisional application No. 63/430,842, filed on Dec. 7, 2022.

(51) Int. Cl.
| | |
|---|---|
| *F16K 41/02* | (2006.01) |
| *F16K 1/46* | (2006.01) |
| *F16K 11/044* | (2006.01) |
| *F16K 31/126* | (2006.01) |

(52) U.S. Cl.
CPC ............... *F16K 41/02* (2013.01); *F16K 1/46* (2013.01); *F16K 11/044* (2013.01); *F16K 31/126* (2013.01); *Y10T 137/86879* (2015.04); *Y10T 137/87788* (2015.04)

(58) Field of Classification Search
CPC ........... F16K 11/044; Y10T 137/87788; Y10T 137/86879
See application file for complete search history.

(56) References Cited

U.S. PATENT DOCUMENTS

| | | | | |
|---|---|---|---|---|
| 3,635,247 A | * | 1/1972 | Myers | F16K 39/022 137/625.5 |
| 6,053,200 A | * | 4/2000 | Crochet | F16K 11/044 137/557 |
| 6,293,300 B1 | * | 9/2001 | Dumke | F16K 1/446 137/613 |
| 6,701,959 B1 | * | 3/2004 | Flynn | F15B 13/044 137/625.65 |

\* cited by examiner

*Primary Examiner* — Robert K Arundale
(74) *Attorney, Agent, or Firm* — Reid E. Dammann; Gordon Rees Scully Mansukhani LLP

(57) ABSTRACT

A valve with a bushing is disclosed. The bushing is configured to provide axial pressure towards one or more seals to allow easier assembly and disassembly. The configuration provided allows for easier maintenance and prevent damage to the one or more seals.

9 Claims, 6 Drawing Sheets

VALVE WITH STEPPED BUSHING DESIGN

CROSS-REFERENCE TO RELATED PATENT APPLICATIONS

This application claims priority to and the benefit of U.S. Provisional Patent Application No. 63/430,842 filed Dec. 7, 2022 which is incorporated by reference herein in its entirety.

BACKGROUND OF THE INVENTION

This application relates to a valve. Specifically, a backwash valve configured for a media filter system.

Typically, during maintenance of these valves, seals (e.g. o-rings and/or gaskets) within the valves are prone to damage (e.g. cutting). That is because these seals are placed semi-permanently within specific parts of the valve, or the seals restrict disassembly of the valves in order for one to perform maintenance. There is a need for these valves to include a sealing system in which the seals can easily be removed and/or replaced without damaging the seal.

One particular part of the valve that is particularly of concern is the valve bushing. Valve bushing designs have been the same and all have the same issue of a straight shaft that utilizes seals on the exterior of the bushing and potential seal damage and leaking can occur. Typically, the seals are on the outside of the bushing for sealing purposes between the valve body, bushing and valve shaft.

The new design disclosed herein will allow for a single directional installation of the valve bushing, and improve efficiency of installation of the bushing and allow for easier service to be performed.

DETAILED DESCRIPTION OF THE INVENTION

Figure 1:
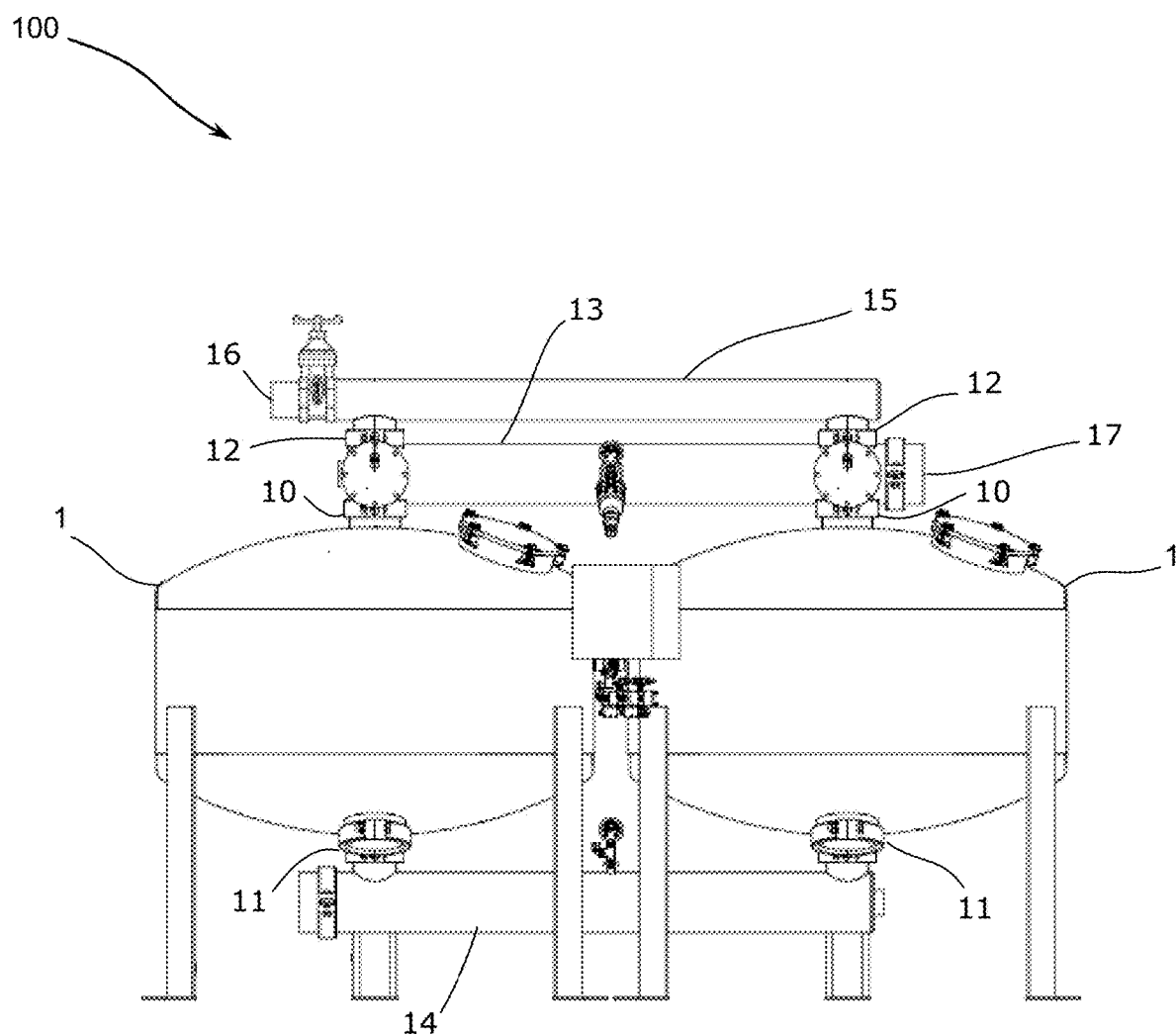
FIG. 1 shows an exemplary filtration system using a backwash valve.

The particulars shown herein are by way of example and for purposes of illustrative discussion of the disclosed embodiments and are presented to provide a readily understood description of the principles and conceptual aspects. In this regard, no attempt is made to show structural details in more detail than is necessary for a fundamental understanding, and the description taken together with the drawings make apparent to those skilled in the art how the disclosed devices and methods may be embodied in practice.

In one embodiment, a valve for a filtering system is disclosed. The valve comprising a valve body having a fluid inlet opening, a vessel opening, and a backwash opening. A movable valve seal housed within the valve body. An actuator configured to move the valve seal to selectively block a fluid communication from the vessel opening from one of the fluid inlet opening and backwash opening. A bushing housed within the valve body, wherein the bushing includes a main bushing body and a bushing lip. The actuator comprises a valve shaft extending from an actuator can, through the bushing, and to the valve body, and wherein the valve shaft is attached to the movable valve seal. A first seal located between the bushing lip and the valve body. A second seal located between the main bushing body and the valve body, wherein a radius of the second seal is less than a radius of the first seal.

In one embodiment, a valve for a filtering system is disclosed. The valve including a valve body having a fluid inlet opening, a vessel opening, and a backwash opening a movable valve seal housed within the valve body. An actuator configured to move the valve seal to selectively block a fluid communication from the vessel opening from one of the fluid inlet opening and backwash opening. A bushing housed within the valve body, wherein the bushing includes a main bushing body and a bushing lip. The actuator comprises a valve shaft extending from an actuator can, through the bushing, and to the valve body, and wherein the valve shaft is attached to the movable valve seal. A first seal located between the bushing lip and the valve body. A second seal located between the main bushing body and the valve body. The first and second seal is configured to be compressed in an axial direction from a force enacted by the actuator.

In one embodiment, a valve for a filtering system is disclosed. The valve comprising a valve body having a fluid pathway, an actuator configured to selectively control said fluid pathway within the valve body, a bushing housed within the valve body. The bushing includes a main bushing body and a bushing lip. The actuator comprises a valve shaft extending from an actuator can, through the bushing, and to the valve body, and wherein the valve shaft is attached to the movable valve seal. A first seal located between the bushing lip and the valve body. A second seal located between the main bushing body and the valve body. The first and second seal is configured to be compressed in an axial direction from a force enacted from the actuator.

The configuration disclosed herein prevents the damaging of seals during disassembly of valves, specifically backwash valves for media filter systems. Currently no prior art valves utilize downward pressure to retain the bushing and in turn utilize a sealing surface on a stepped edge. Other bushing designs include a straight shaft. Other bushings also utilize an O-ring to seal on the radial exterior of the bushing for compression rather than a longitudinal compression of the invention herein. This configuration disclosed herein also eliminates gasket cutting. Installation of the bushing is difficult on prior art bushings and in many cases the seals will get damaged on new equipment assembly and during a rebuild in the field. During assembly and/or rebuilding of a valve the exterior seals have the potential of being cut. With a stepped design disclosed herein, the bushing will be a single directional installation and retained in place to compress the or-rings/gaskets. The configuration disclosed herein will additionally allow for a single directional installation of the valve bushing, and thus will improve efficiency of installation of the bushing and allow for easier service to be performed.

As shown in FIG. 1 a filtration system 100 is shown. The filtration system includes one or more vessels 1 that contains a filtration media within the vessel. The filtration system comprises an inlet 10 through which the fluid intended for filtration is introduced. The inlet is coupled to a valve 12 in which unfiltered water travels through and enters the filtration vessel 1 via inlet 10. A distribution manifold 13 is disposed to each inlet 10 of each vessel 1, where the manifold is fluidly connected to one or more vessels 1. The vessels 1 includes an outlet 11 that is connected to an outlet manifold 14 where the filtered water is intended to be distributed for its intended use. The filtration system 100 may undergo a backwash procedure. This backwash procedure is a reversing of the flow of water that hydraulically lifts the media bed of each tank purging any trapped contaminants within the media within the vessel. During this backwashing procedure. Water flow is reversed and flows from one outlet 11 of one vessel 1 to one outlet of another vessel 1 and drains into a backwash manifold 15 to a backwash outlet 16. The flow of water depends on the chosen vessel that is required to be cleaned. For example, if the left vessel is required to be backwashed, then the water flow from the inlet of the right vessel to the outlet of the left vessel (via an outlet manifold) and then up towards the inlet of the left vessel. The management of this flow is configured to be controlled by one or more valves 12. Unfiltered liquid is configured to be received from a source from the source inlet 17 of the distribution manifold 13.

Figure 2:
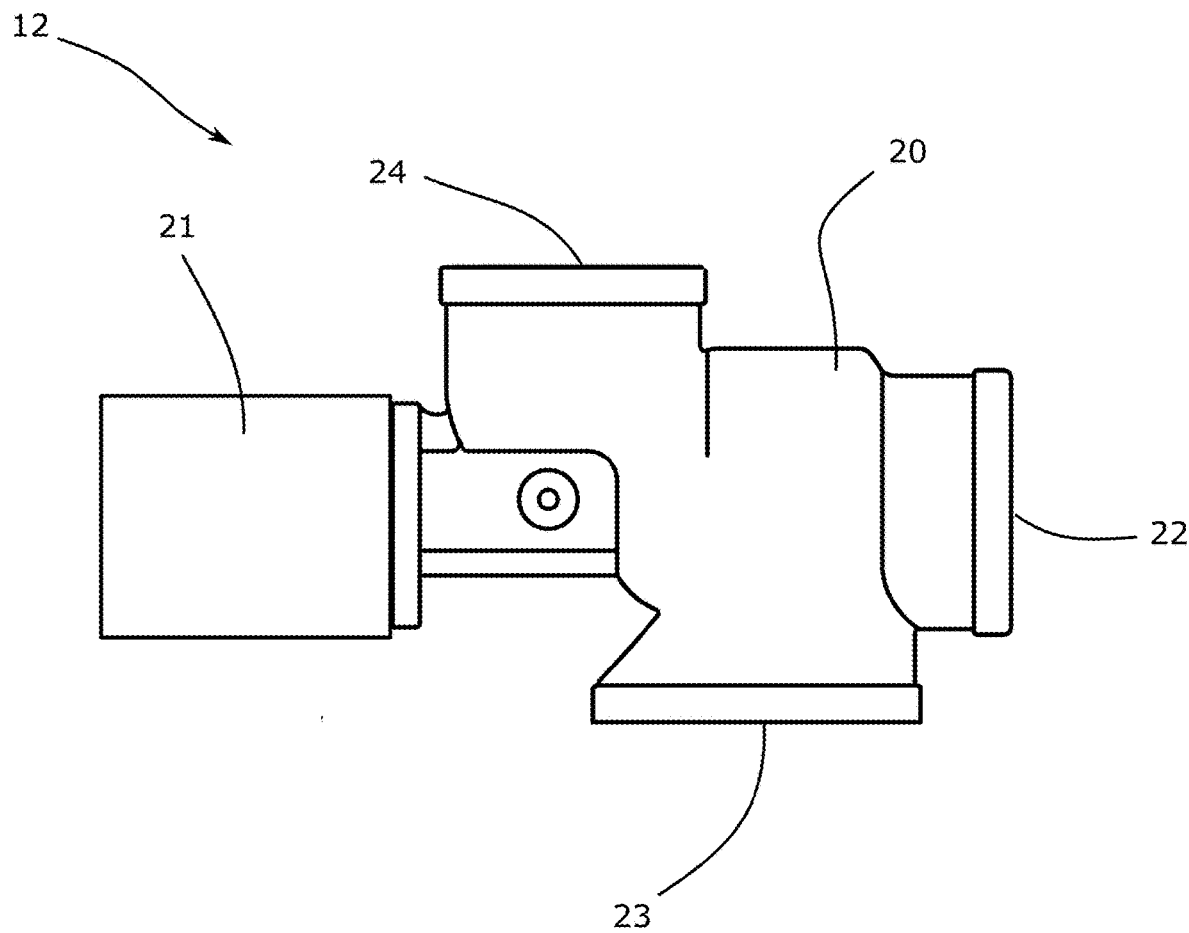
FIG. 2 shows a side view of an exemplary simplified backwash valve.

Referring now to FIG. 2, a close up side view of a valve 12 is shown. The valve includes a valve body 20, an actuator 21, a valve inlet opening 22, a valve vessel opening 23, and a valve backwash opening 24. The inlet opening 22 is configured to receive unfiltered liquid and enter the vessel via vessel opening 23 during regular filtering operation. During the backwash operation the actuator moves a seal within the valve to allow the flow from the vessel opening 23 to move towards the backwash opening 24. The actuator 21 may be electromechanically, hydraulically, or pneumatically actuated. The actuator may be located opposite of the valve inlet opening 22.

Figure 3:
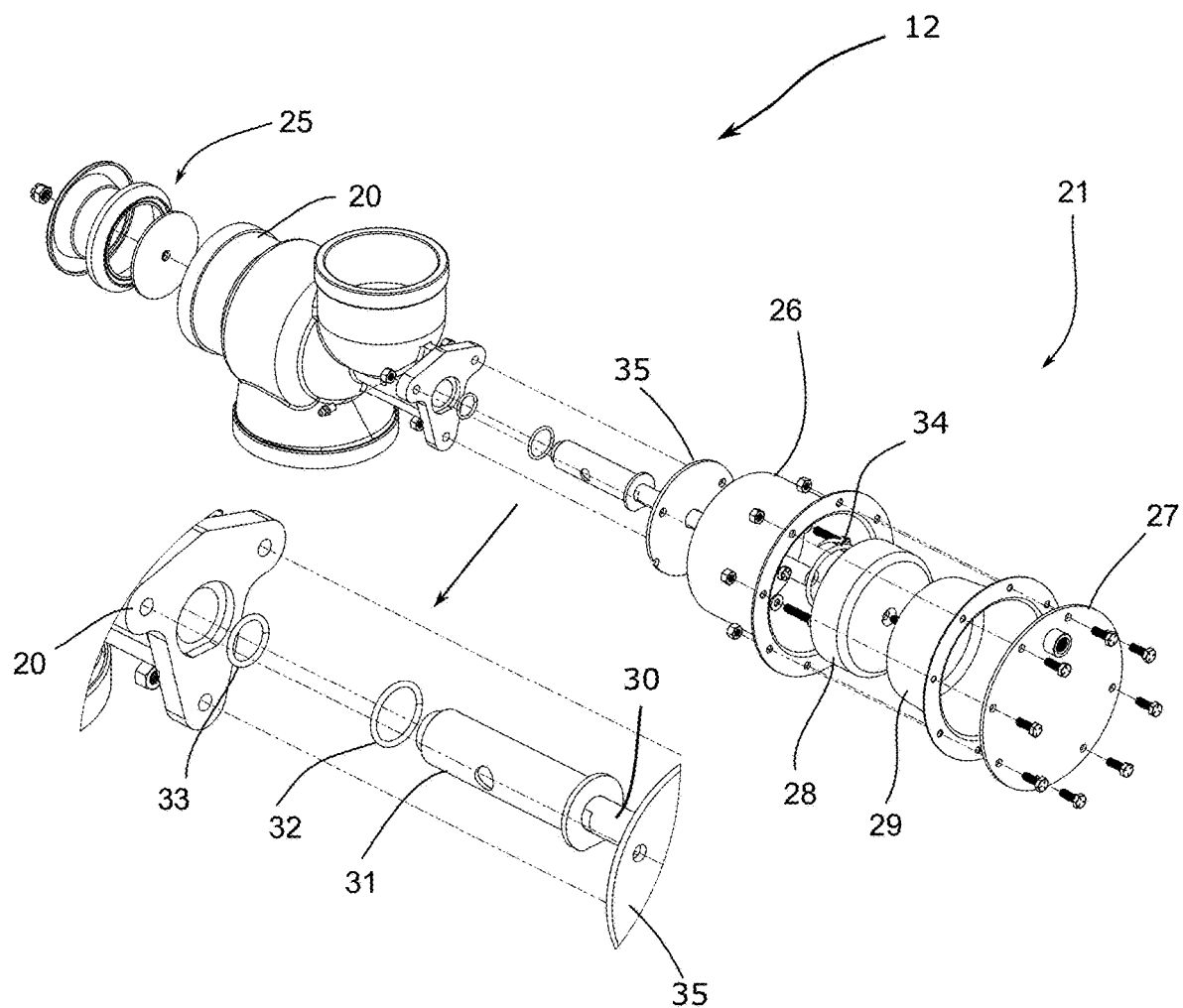
FIG. 3 shows an exemplary backwash valve disassembled.

Referring now to FIG. 3, a disassembled view of the valve is presented. The valve body 20 houses a valve seal 25, where the valve seal 25 selectively opens and closes the conduit path within the valve. The valve body is utilized to retain parts and components of valve and transfer of fluids. In the embodiment shown in FIG. 3, the actuator 21 is hydraulically or pneumatically actuated. The actuator 21 includes an actuator can 26 with an actuator lid 27 that houses a piston 28 and a diaphragm 29. The actuator lid 27 seals a pressurized area within actuator can which in turn allows for valve shaft movement for opening and closing of different conduits in the valve. The diaphragm 29 is configured to expand and contract within the can 26 in order to abut and move the piston 28 and thus moving the valve seal 25, via a valve shaft 30, within the valve body 20 in order to control the flow path of the liquid that passes through the valve 12. In this inflated state the piston is in an actuated state. The valve shaft 30 is attached to the piston and extends from the cannister towards the valve body (i.e. extending from the actuator side and towards the valve inlet opening 22) and is attached to the valve seal 25. The valve shaft extends through a valve bushing 31 which includes a first bushing seal 32 and second bushing seal 33. The configuration of the bushing 31 and bushing seals 32 and 33 prevent unwanted contaminants or liquid from exiting the valve to the actuator side of the valve body 20. The bushing also aids in maintaining the centering of the valve shaft for effective sealing. A spring 34 may be placed under the piston, in order to bias the piston such that when the diaphragm is deflated, the spring forces the piston back to its resting state (i.e. opposite of the piston actuated state). The spring 34 may be seated onto an actuator plate 35. The actuator plate acts as a base for the spring 34 and is configured to abut the valve bushing 31. As the valve diaphragm 29 expands, it forces the piston downwards. The force enacted on the piston is also partially transferred to the spring and onto the actuator plate 35. This force allows the pressure from the diaphragm to force the actuator plate onto the valve bushing 31 and thus axially compressing the first bushing seal 32 and second bushing seal 33. The first seal 32 and second seal 33 is configured to be positioned between the bushing 31 and valve body 20. A simplified schematic of this configuration can be shown in FIG. 8. As discussed before, in another embodiment, the mechanical movements of the piston, and thus the seal, can also be done electromechanically (e.g. via linear actuator) rather than hydraulically or pneumatically.

Figure 4:
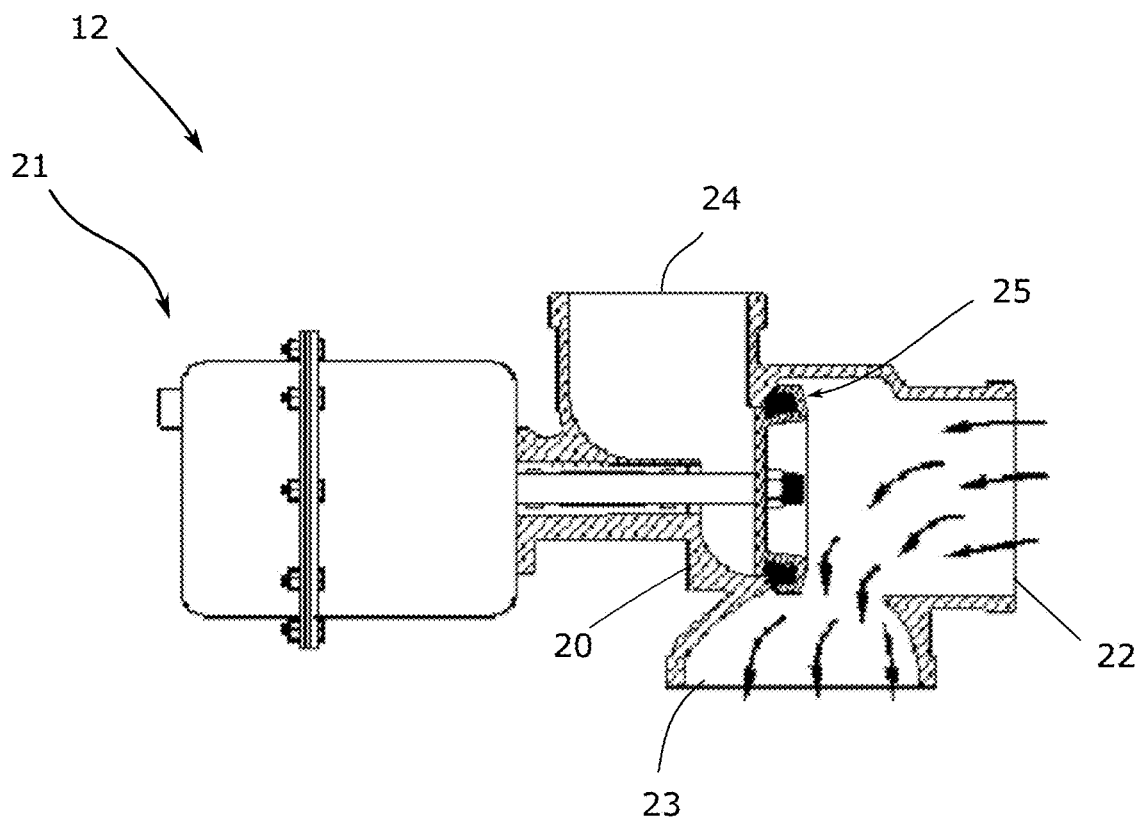
FIG. 4 shows a first state of a backwash valve.
Figure 5:
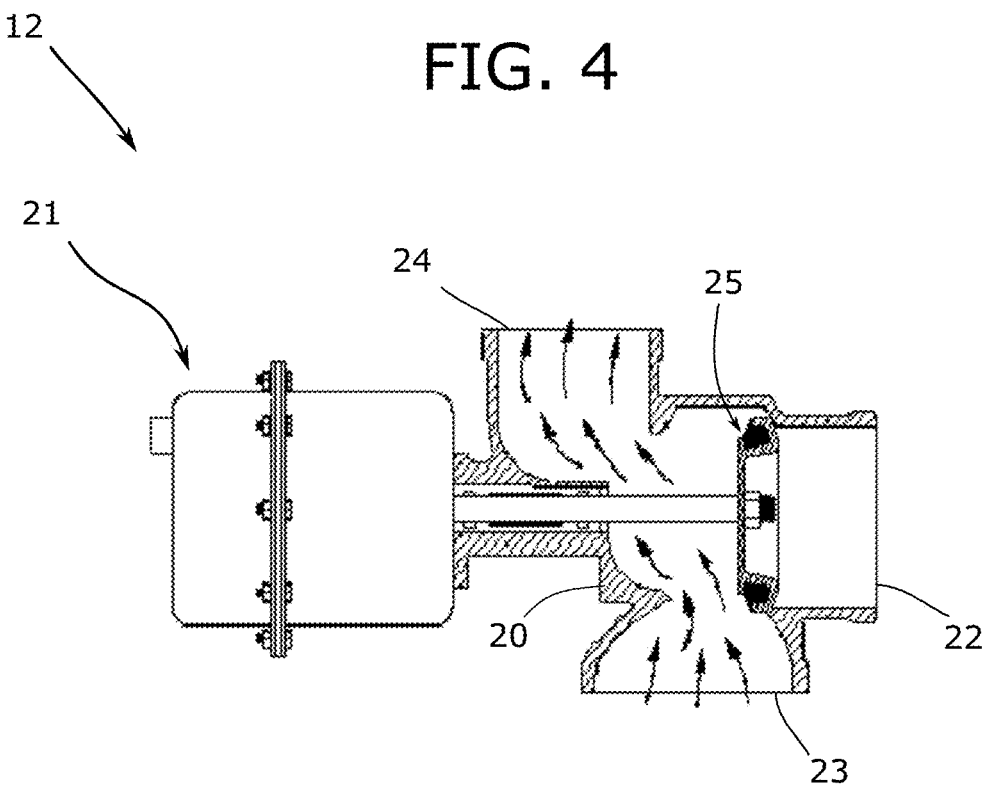
FIG. 5 shows a second state of a backwash valve.

Referring now to FIGS. 4 and 5, which shows the valve 12 in its resting state on FIG. 4 and its actuated state in FIG. 5. In the resting state, as shown in FIG. 4, the valve is receiving unfiltered liquid (e.g. unfiltered water) from a source via valve inlet opening 22 and channeling the flow of liquid towards the vessel opening 23 towards the vessel (not shown) while the valve seal 25 blocks the backwash opening 24. In a backwash operation, the valve will be configured in the actuated state, as shown in FIG. 5. The valve seal 25 blocks the valve inlet opening 22 and allows flow of liquid from the vessel (not shown) into the backwash opening 24.

Figure 6:
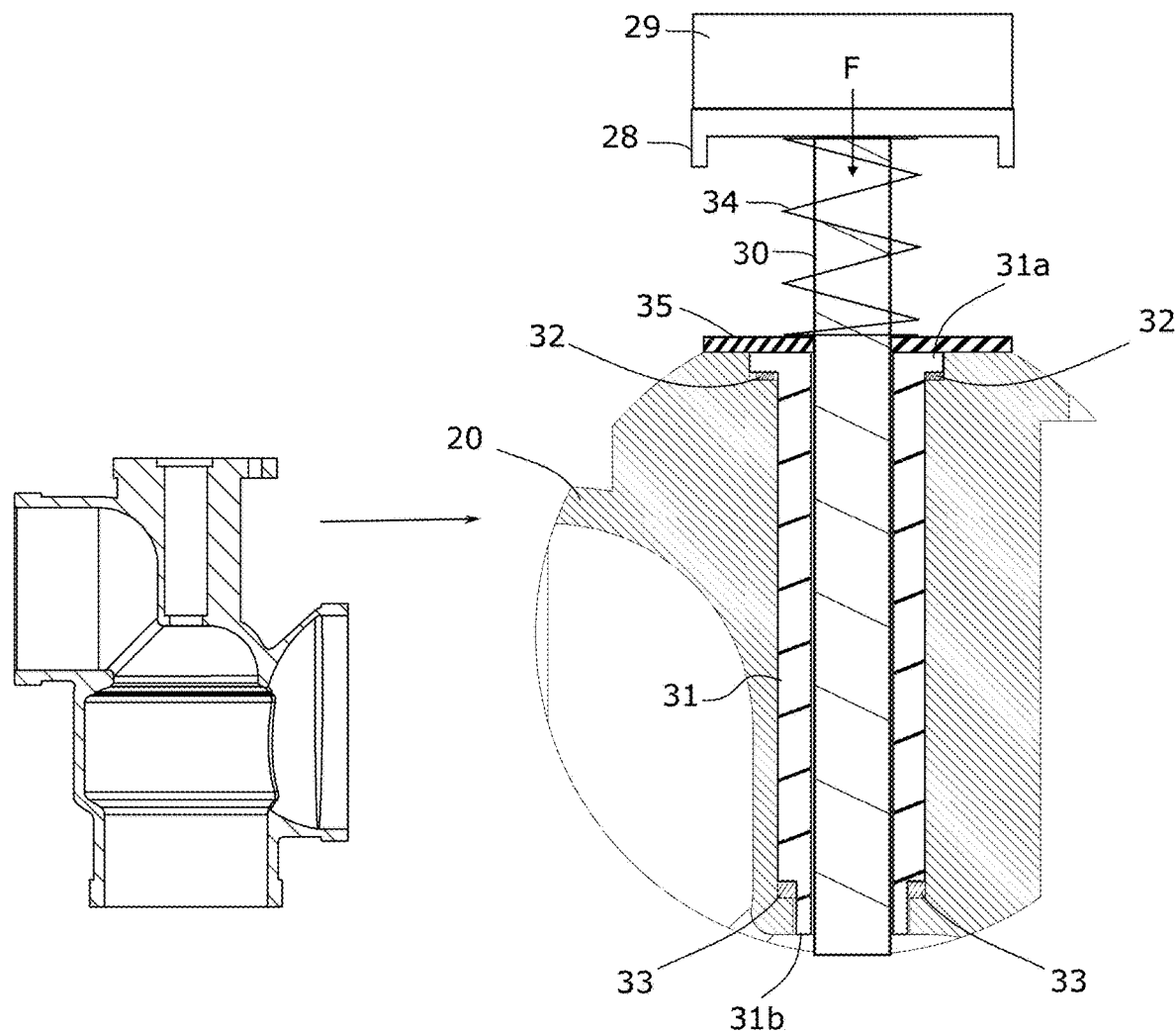
FIG. 6 shows a close up of a portion of the valve.

FIG. 6 shows an isolated view of the interface of the actuator to other components of the valve. Some components, such as the actuator can, actuator lid, etc. has been removed for clarity. During the backwash cycle, the valve diaphragm 29 is expanded so that the piston 28 can be pushed downwards in order to move the shaft 30 so that the valve seal 25 (not shown) blocks the valve inlet opening 22 (not shown). The force F enacted by the valve diaphragm 29 onto the spring 34 via the piston 28 creates a downwards pressure onto the actuator plate 35, which forces the bushing to push in the axial direction on to the first and second seals 32/33. This axial force (e.g. downwards force) aids in sealing pressure of the seals 32/33 to prevent unwanted contaminants or liquid from exiting the valve body and entering the valve actuator 21. In one embodiment, the radius of the second seal 33 is greater than the radius of the first seal 32.

Figure 7A:
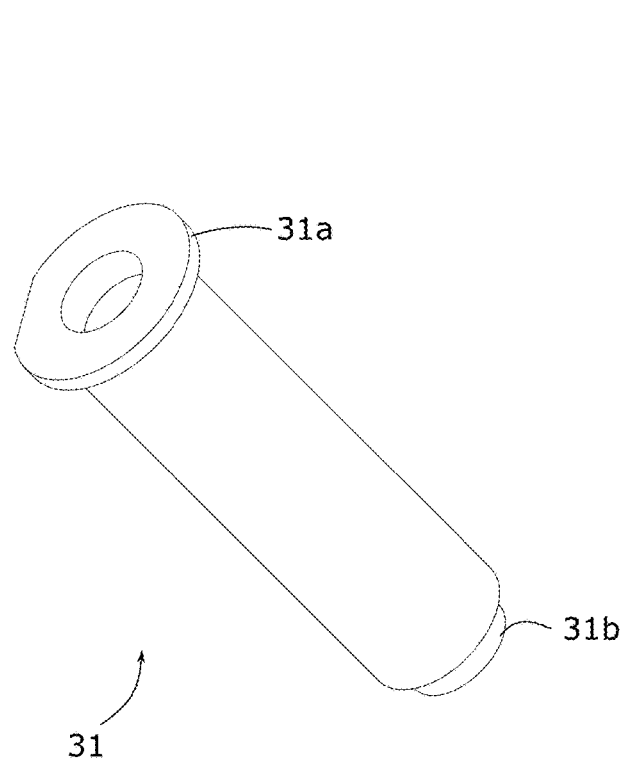
FIG. 7a-7c shows a detailed look of the valve bushing.
Figure 7B:
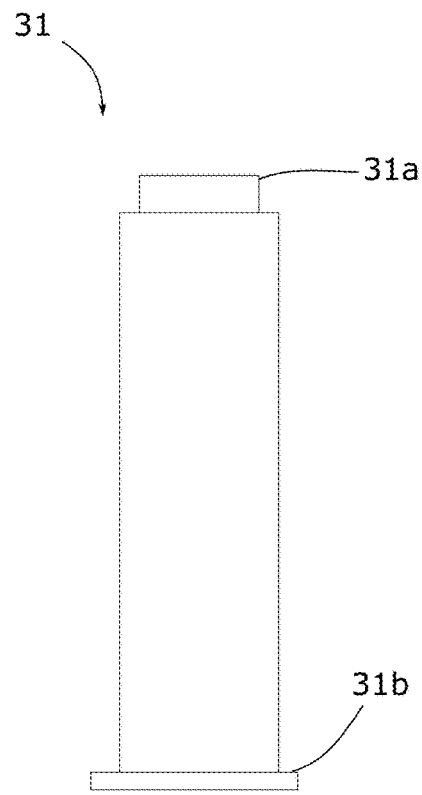
Figure 7C:
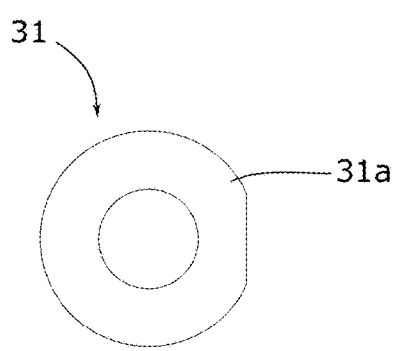

FIGS. 7a-7c shows an isolated view of the bushing. The bushing 31 comprises a lip 31a and a projection 31b. The lip 31a and projection 31b allows the bushing to be firmly seated and securely fitted into the valve body 20.

Valve body 20 may be made of cast iron which in turn is machined to accept the valve bushing 31. The bushing 31 is machined to fit within the valve body 20 casting and prevent any excessive tolerances. The disclosed bushing configuration facilitates simplified installation and disassembly of the valve while preserving effective sealing between its components.

The invention claimed is:

1. A valve for a filtering system, said valve comprising:
 a valve body having a fluid inlet opening, a vessel opening, and a backwash opening;
 a movable valve seal housed within the valve body;
 an actuator configured to move the valve seal to selectively block a fluid communication from the vessel opening from one of the fluid inlet opening and backwash opening;
 a bushing housed within the valve body, wherein the bushing includes a main bushing body and a bushing lip;
 wherein the actuator comprises a valve shaft extending from an actuator can, through the bushing, and to the valve body, and wherein the valve shaft is attached to the movable valve seal;

a first seal located between the bushing lip and the valve body;

a second seal located between the main bushing body and the valve body; and wherein the first and second seal is configured to be compressed in an axial direction from a force enacted by the actuator.

2. The valve of claim 1, wherein the force enacted by the actuator is from an expandable diaphragm disposed within the actuator can.

3. The valve of claim 1, wherein the actuator includes a diaphragm disposed within the actuator can, wherein the diaphragm is actuated hydraulically or pneumatically.

4. The valve of claim 3, wherein the actuator further includes a piston configured to abut the diaphragm, wherein the piston is connected to the valve shaft.

5. The valve of claim 1, wherein a radius of the second seal is less than a radius of the first seal.

6. The valve of claim 1, wherein the bushing is configured to be inserted to the valve body from an actuator side of the valve body.

7. The valve of claim 1, wherein the bushing comprises of a lip at one end of the bushing and a projection at the other end of the bushing.

8. The valve of claim 7, wherein the lip of the bushing is located adjacent to the actuator.

9. A valve for a filtering system, said valve comprising:

a valve body having a fluid pathway;

an actuator configured to selectively control said fluid pathway within the valve body;

a bushing housed within the valve body, wherein the bushing includes a main bushing body and a bushing lip;

wherein the actuator comprises a valve shaft extending from an actuator can, through the bushing, and to the valve body, and wherein the valve shaft is attached to a movable valve seal;

a first seal located between the bushing lip and the valve body;

a second seal located between the main bushing body and the valve body; and wherein the first and second seal is configured to be compressed in an axial direction from a force enacted from the actuator.

* * * * *